United States Patent [19]

Park

[11] Patent Number: 5,656,780
[45] Date of Patent: Aug. 12, 1997

[54] CAPACITIVE PRESSURE TRANSDUCER WITH AN INTEGRALLY FORMED FRONT HOUSING AND FLEXIBLE DIAPHRAGM

[75] Inventor: Kyong M. Park, Thousand Oaks, Calif.

[73] Assignee: Kavlico Corporation, Moorpark, Calif.

[21] Appl. No.: 623,359

[22] Filed: Mar. 28, 1996

[51] Int. Cl.$^6$ ...................................................... G01L 9/12
[52] U.S. Cl. ............................ 73/724; 73/718; 361/283.4
[58] Field of Search ..................... 73/724, 718; 361/283.4

[56] References Cited

U.S. PATENT DOCUMENTS

| 4,398,426 | 8/1983 | Park et al. | 73/724 |
| 4,617,607 | 10/1986 | Park et al. | 73/718 |
| 5,060,108 | 10/1991 | Baker et al. | 361/283.4 |
| 5,233,875 | 8/1993 | Obermeier et al. | 73/718 |
| 5,329,819 | 7/1994 | Park et al. | 73/724 |

Primary Examiner—Richard Chilcot
Assistant Examiner—Joseph L. Felber
Attorney, Agent, or Firm—Oppenheimer Poms Smith

[57] ABSTRACT

A simplified capacitive pressure transducer includes a conductive surface, a portion of which is a surface of a flexible diaphragm in direct contact with a pressure to be measured, and an insulating substrate defining a plurality of capacitor electrodes sized to accommodate the measurement of pressures within a particular pressure range. The pressure transducer includes a front housing and a rear housing which are fitted together to provide a transducer chamber within which a hybrid circuit is secured. The insulating substrate includes a reference capacitor electrode, a variable capacitor electrode and vias. The insulating substrate is mechanically coupled to the front housing such that the conductive surface of the front housing and the reference capacitor electrode form a reference capacitor, and the conductive surface and the variable capacitor electrode form a variable capacitor. The reference capacitor electrode and the variable capacitor electrode are electrically connected to the hybrid circuit through the vias.

20 Claims, 4 Drawing Sheets

CAPACITIVE PRESSURE TRANSDUCER WITH AN INTEGRALLY FORMED FRONT HOUSING AND FLEXIBLE DIAPHRAGM

BACKGROUND OF THE INVENTION

1. Field of the Invention

The present invention relates to a pressure transducer and, more particularly, a simplified capacitive pressure transducer including a flexible diaphragm in direct contact with a pressure to be measured. The pressure transducer further includes an insulating substrate defining a plurality of capacitor electrodes sized to accommodate the measurement of pressures within a particular pressure range.

2. Description of the Related Art

High pressure transducers typically generate an output voltage which, ideally, is predictably related to the pressure being measured. Such predictability is often effected by the magnitude of the pressure being measured and by other characteristics of the operating environment. Such predictability could, for example, constitute a linear relationship between the pressure being measured and the output voltage of the transducer. In a pressure transducer of this type, changes in the temperature of the operating environment are known to adversely effect the transducer's performance characteristics by introducing nonlinearities in the output voltage.

U.S. Pat. No. 5,329,819 to Park et al. exemplifies a high pressure transducer of the prior art. The Park et al. transducer includes a thin flexible ceramic diaphragm of low mechanical hysteresis which is mechanically coupled to the pressure being measured through a layer of epoxy and a thick metal diaphragm. Deflection of the thin diaphragm, which serves as an electrode of a variable capacitor, varies a transducer output voltage as described above. It is also noted that the high pressure input fitting employed in the 5,329,819 patent requires a change in diameter, or a plurality of component parts, which increase the cost of the transducer. In addition to the adverse effects of temperature and pressure changes, the performance characteristics of the Park et al. transducer are also influenced by the lack of direct contact between the thin diaphragm and the pressure being measured.

In such prior art transducers, the gap between variable capacitor electrodes must be accurately established and maintained throughout the manufacturing process. To the extent that the number of precision machined parts is reduced by employing welding as a step in the assembly process, the cost of manufacturing pressure transducers can be reduced. However, caution must be exercised not to apply excess heat to materials near the gap of the variable capacitor. Otherwise, the gap dimensions might be intolerably and irreversibly changed by the thermal expansion of the materials surrounding the gap. Thus, the prior art lacks a capacitive high pressure transducer which is easily and affordably assembled while maintaining accurate gap tolerances for the duration of the assembly procedure.

Accordingly, an object of the present invention is to provide a capacitive high pressure transducer wherein a gap between variable capacitor electrodes of the transducer is accurately established and maintained during assembly of the transducer.

Another object is to provide a pressure transducer which utilizes selected materials to anticipate and compensate for thermal expansions of these materials during assembly of the transducer.

Another object is to provide a capacitive pressure transducer with superior performance characteristics over varying pressures and temperatures.

Another object is to provide a capacitive pressure transducer with a flexible variable capacitor electrode which is in direct contact with the pressure being measured.

Another object is to provide a simplified capacitive high pressure transducer which is more simply and economically assembled from fewer components.

SUMMARY OF THE INVENTION

In accordance with a specific illustrative embodiment of the present invention, a simplified capacitive pressure transducer includes a front housing, a rear housing, an electronic circuit for providing an output signal variable in accordance with changes in input capacitance, and an insulating substrate. The front housing includes a conductive surface and a flexible diaphragm wherein a portion of the conductive surface defines the flexible diaphragm. The rear housing is fitted to the front housing forming a transducer chamber within which the electronic circuit is secured. The insulating substrate includes a reference capacitor electrode, a variable capacitor electrode and vias. The insulating substrate is mechanically coupled to the front housing such that the conductive surface and the reference capacitor electrode form a reference capacitor, and the conductive surface and the variable capacitor electrode form a variable capacitor. The reference capacitor electrode and the variable capacitor electrode are electrically connected to the electronic circuit through the vias.

In a further aspect of the present invention, the rear housing includes an internal ridge surface which secures the insulating substrate to .the front housing when the transducer is assembled.

In an alternative embodiment of the present invention, the insulating substrate includes conduits through which screws are passed and the front housing includes threaded chambers for receiving the screws for securing the insulating substrate to the front housing.

In accordance with a broader aspect of the invention, the insulating substrate includes a plurality of capacitor electrodes which, with the conductive surface, form a plurality of capacitors.

In accordance with another feature of this invention, the high pressure input front housing may be a single, homogeneous high pressure fitting with a constant diameter bore terminative in said flexible diaphragm.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein.

DETAILED DESCRIPTION OF THE PREFERRED EMBODIMENTS

Figure 1:
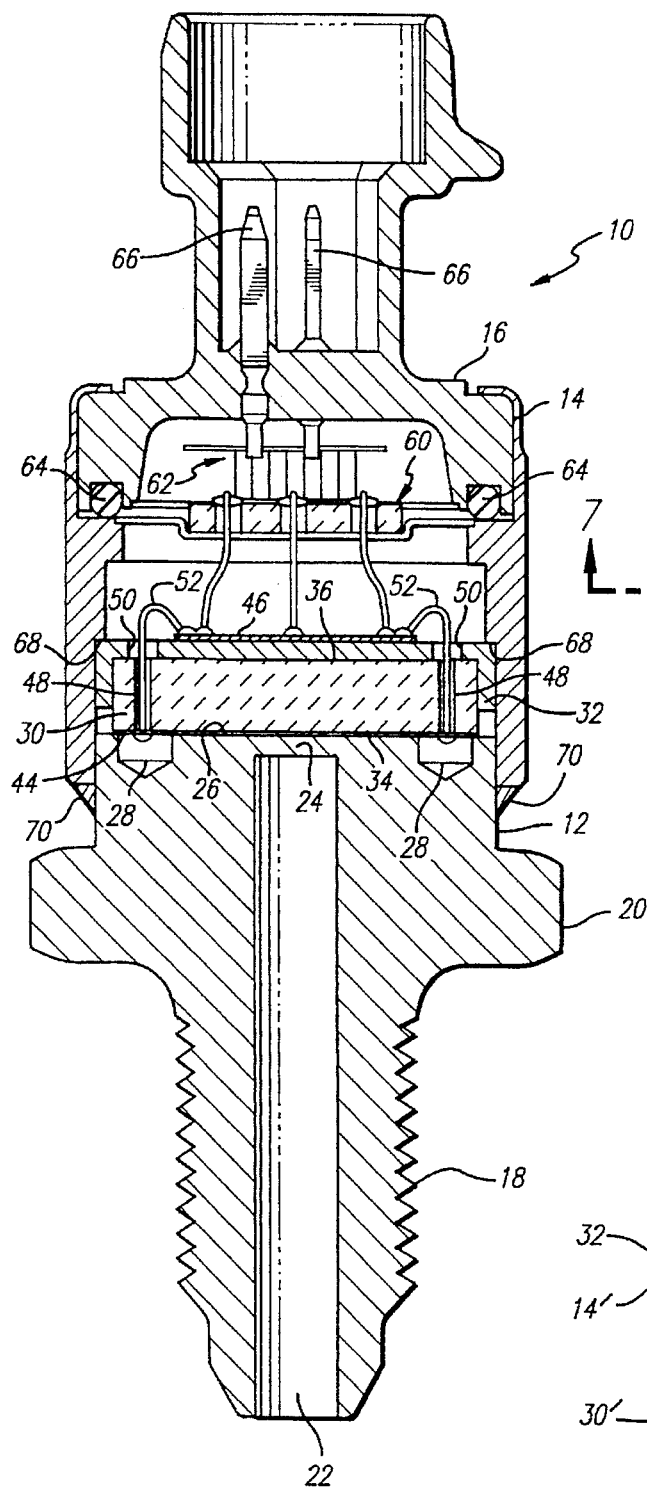
FIG. 1 is a cross-sectional side view of the simplified capacitive high pressure transducer of the present invention.

FIG. 1 is a cross-sectional side view of a simplified capacitive high pressure transducer 10. The preferred embodiment shown in FIG. 1 comprises a front housing 12, a rear housing 14 and a connector 16. The front housing 12 includes a threaded exterior surface 18 for securing the transducer 10 to an environment which is characterized by a pressure to be measured by the transducer 10. The front housing 12 also includes a gripping portion 20 which comprises a hexagonal nut, for example.

Preferably, the front housing 12 is formed from stainless steel 15-5 pH, heat treated at 900° F. for four hours before or after rough machining, and is air cooled. During manufacture, a pressure chamber with a preferred diameter of 0.187 inches is bored into the front housing 12. The pressure chamber is bored to provide a chamber wall 22 and a flexible diaphragm 24. The front housing 12 additionally includes a substantially flat conductive surface 26 into which recesses 28 are formed by conventional machining techniques. The flexible diaphragm 24 is bound on opposing sides by the chamber wall 22 and the conductive surface 26 and preferably has a thickness of 0.051±0.001 inches.

The transducer further comprises an insulating substrate 30 and a spacer 32. The insulating substrate 30 may be made from alumina or any other insulating material having low mechanical hysteresis such as glass or ceramic. The substrate includes a front surface 34 and a rear surface 36. The spacer 32 preferably is made from high strength brass. As shown in FIG. 1, the insulating substrate 30 and the spacer 32 are sized such that the spacer 32 fits securely over the insulating substrate 30. Alternatively, the insulating substrate 30 and the spacer 32 may be manufactured together as a single modular assembly sized to fit within the chamber formed by the housing portions 12, 14 of the transducer 10.

Figure 6:
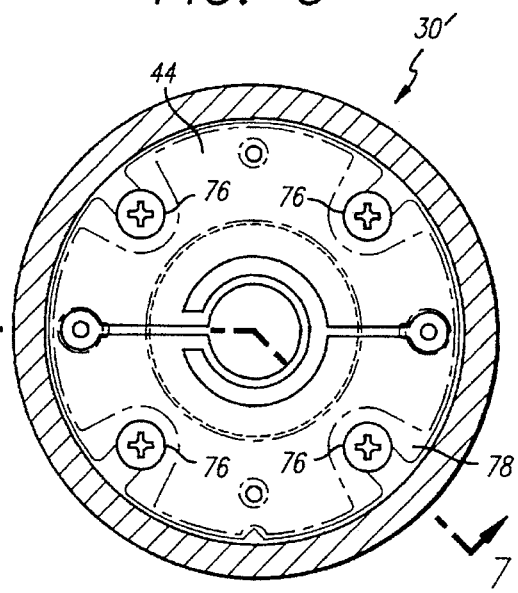
FIG. 6 is a bottom view an alternative embodiment of the insulating substrate.
Figure 4:
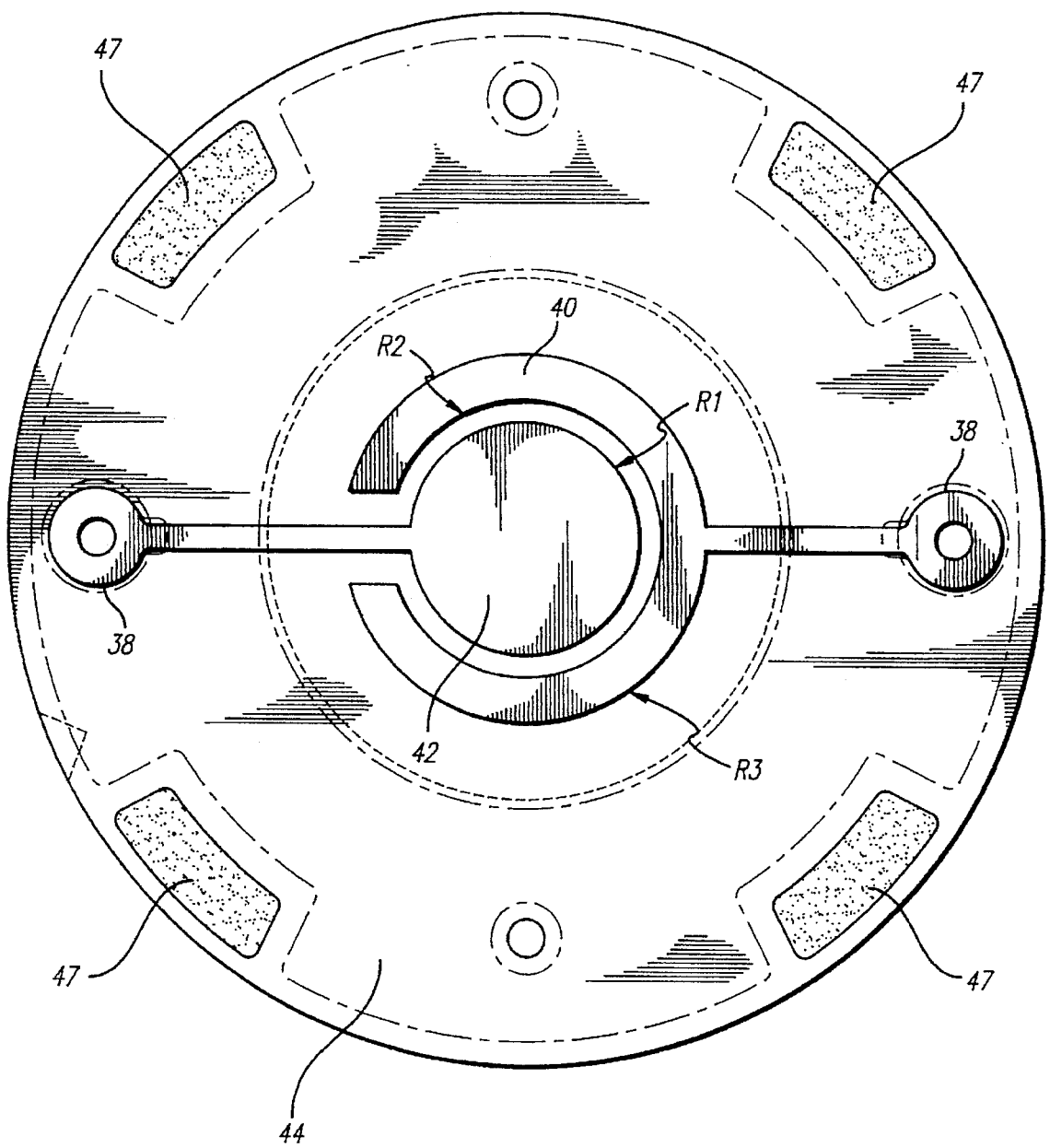
FIG. 4 is a bottom view of a insulating substrate of the simplified capacitive high pressure transducer.

The front surface 34 of the insulating substrate 30 actually includes several substrate layers which are best illustrated in FIG. 4. During fabrication of the insulating substrate 30, a screen is conventionally employed to provide conductors 38. An electrode substrate is thereafter screened over the conductors 38. In a preferred embodiment, the electrode substrate includes a reference capacitor electrode 40 and a variable capacitor electrode 42 which are electrically connected to the conductors 38. Over the electrode substrate, a glass sealing frit 44 is screened as shown in FIG. 4. When the transducer 10 completely assembled, the glass frit 44 separates the front housing 12 from the insulating substrate 30. The thickness of the glass frit 44, and therefore the distance between the conductive surface 26 and the front surface 34, is preferably 5–30 microns. An optional epoxy adhesives 47 may also be provided as shown in FIG. 4. The preferable method to secure the substrate is to use four screws as shown in FIG. 6.

The transducer 10 further comprises a hybrid circuit 46 which is mounted to the spacer as shown in FIG. 1. The insulating substrate 30 is formed with vias 48. Similarly, the spacer 32 is formed with corresponding apertures 50. Preferably, the insulating substrate 30, spacer 32 and hybrid circuit 46 are assembled before the resulting substrate-spacer-hybrid assembly is slid into the rear housing 14.

Leads 52 are soldered to the hybrid circuit 46 and the conductors 38 (not shown in FIG. 1) thereby electrically connecting the reference capacitor electrode 40 and the variable capacitor electrode 42 to the processing circuitry in the hybrid 46. Leads 52 are passed through the vias 48, 50. As discussed below in greater detail, the capacitive pressure transducer 10 is designed such that a gap between the electrodes 40, 42 and the conductive surface 26 is accurately established and maintained during assembly of the transducer 10. To this end, the recesses 28 provide sufficient clearance to allow the leads 52 to be soldered at the front surface 34 of the insulating substrate 30 without interfering with the gap between the electrodes 40, 42 and the conductive surface 26.

Figure 5:
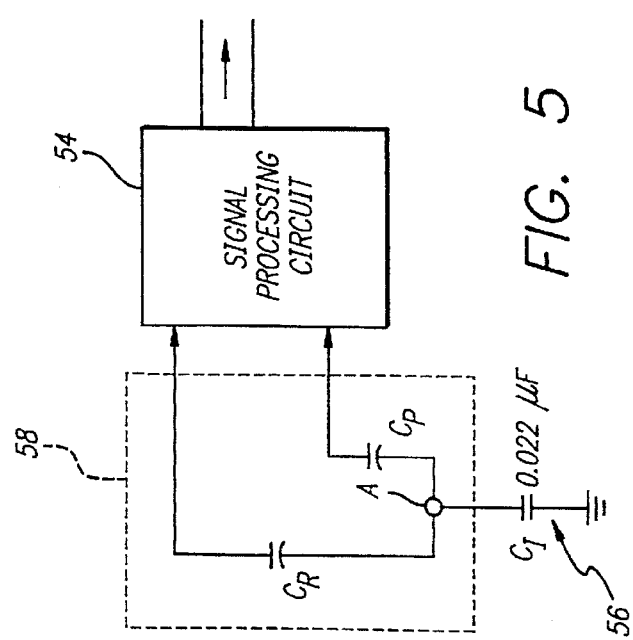
FIG. 5 is an electrical schematic showing the interconnection between a reference capacitor and a variable capacitor of the transducer, an isolating capacitor and a transducer output circuit.

Generally, the insulating substrate 30 is mechanically coupled to the front housing 12 such that the conductive surface 26 and the reference capacitor electrode 40 form a reference capacitor $C_R$, and the conductive surface 26 and the variable capacitor electrode 42 form a variable capacitor $C_P$. FIG. 5 is an electrical schematic showing the electrical interconnection between the reference capacitor $C_R$ and the variable capacitor $C_P$ and a signal processing circuit 54 which is preferably, but not necessarily, embodied in the hybrid circuit 46. Suitable processing circuitry 54 is disclosed in U.S. Pat. Nos. 4,398,426 to Park et al. and 5,233,875 to Obermeier et al. both of which are incorporated herein by reference.

It has been observed that the addition of an isolating capacitor $C_I$ 56, as shown in FIG. 5, substantially eliminates electrical noise problems by providing electrical separation between the front housing 12 and the circuit ground. The isolating capacitor $C_I$ 56 can be an element of, or mounted to, the hybrid circuit 46. Like the reference Capacitor $C_R$ and the variable capacitor $C_P$, the isolating capacitor $C_I$ 56 is electrically connected to the conductive surface 26 of the front housing 12 (represented by electrical node A in FIG. 5). Such an electrical connection may, for example, may be made by electrically connecting one terminal of the isolating capacitor $C_I$ 56 to the hybrid circuit 46 and the other terminal to the spacer 32. The isolating capacitor $C_I$ 56 is preferably 0.022 μF. Finally, it should be understood that a plurality of capacitors 58 (shown in dashed lines), in addition to or in lieu of the reference capacitor $C_R$ and the variable capacitor $C_P$, may be formed by providing a plurality of capacitor electrodes within the insulating substrate 30.

FIG. 1 shows that the simplified capacitive pressure transducer 10 further comprises a feed-through capacitors and plate assembly 60, flexible printed circuit board (PCB) 62, o-ring gasket 64 and connector terminals 66. Output signals from the hybrid circuit 46 are provided to the connector terminals 66 through the feed-through capacitors and plate assembly 60 and the flexible PCB.

Figure 2:
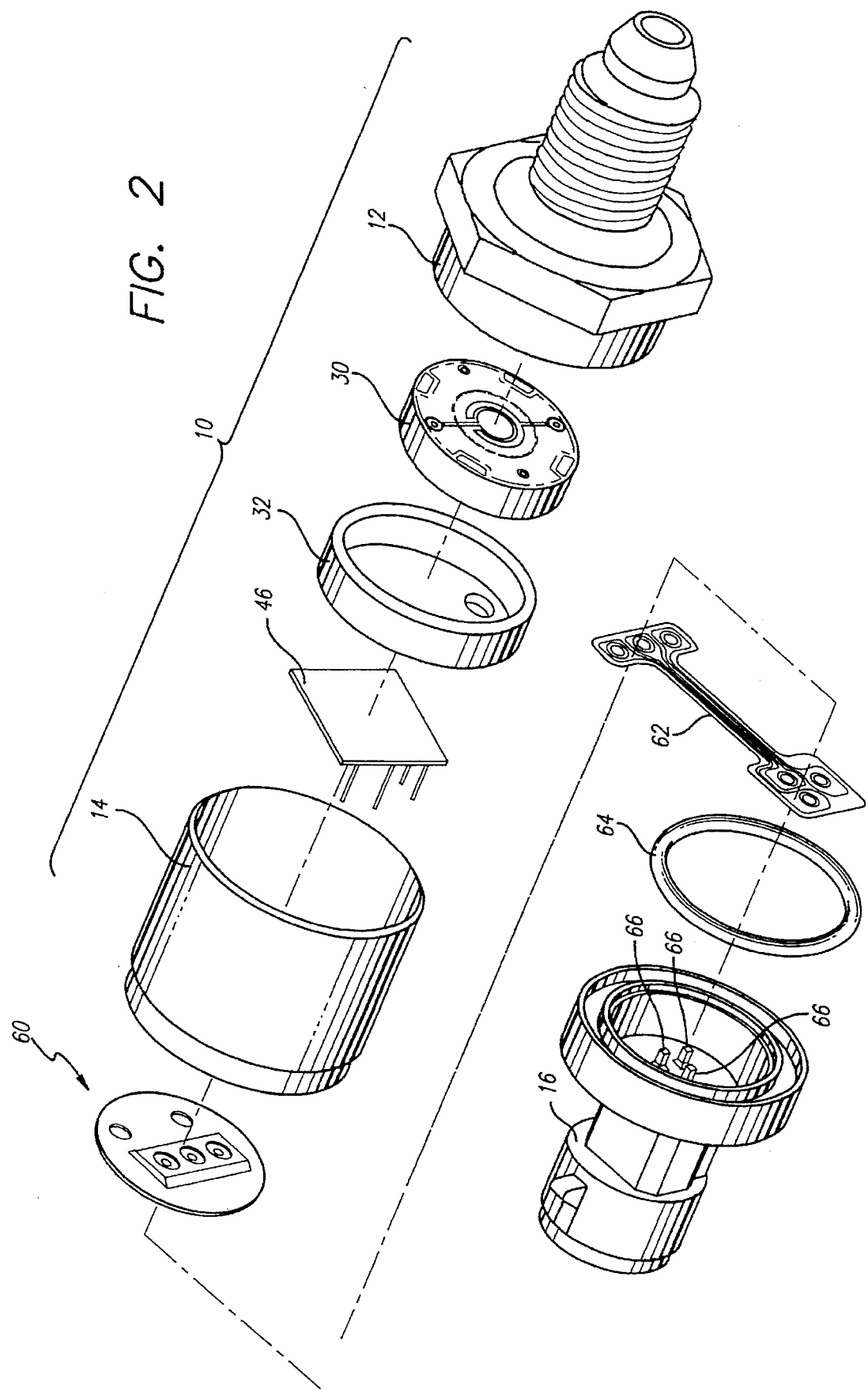
FIG. 2 is an exploded perspective view of the simplified capacitive high pressure transducer of FIG. 1.

FIG. 2 is an exploded perspective view of the simplified capacitive pressure transducer 10. During assembly and with reference to FIG. 1, the substrate-spacer-hybrid assembly is first slid into the rear housing 14 until the spacer 32 makes contact with an internal ridge surface 68 of the rear housing 14. The front housing 12 is then slid into the rear housing 14 with the conductive surface 26 facing the front surface 34. Next, the housings 12, 14 are welded together at weld 70 while applying pressure to keep the glass sealing frit 44 in close contact with both housings 12, 14. After laser trimming and testing, the feed-through capacitors and plate assembly 60 is installed. The o-ring gasket 64 is fitted into the connector 16 before the rear housing 14 and the connector 16 are crimped together.

Figure 3:
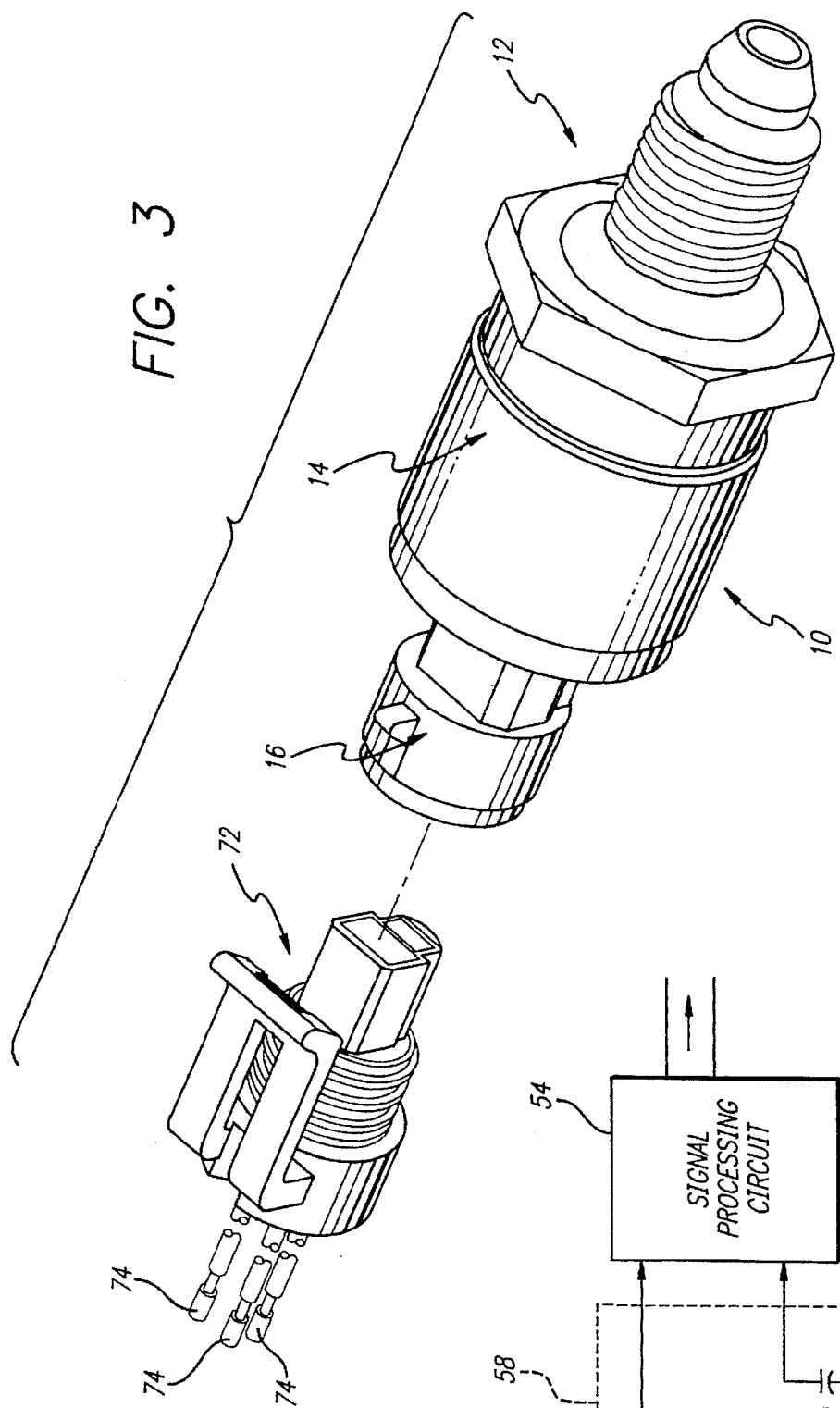
FIG. 3 is a perspective view of the simplified capacitive high pressure transducer of FIG. 1 and a mating connector.

FIG. 3 is a perspective view of the simplified capacitive pressure transducer 10 and a mating connector 72 with pins 74.

A particular advantage of the present invention is that the gaps between the electrodes of the reference capacitor $C_R$ and the variable capacitor $C_P$ are not only accurately established, but also maintained even after the housings 12, 14 are welded together. The thermal expansion coefficients for 15-5 steel, alumina, and high strength brass are $10.8 \times 10^{-6}/°C.$, $7.1 \times 10^{-6}/°C.$, and $20.2 \times 10^{-6}/°C.$, respectively. Thus, through the proper selection and sizing of materials, the combined thermal expansion of the insulating substrate 30 (alumina, 0.160 inches thick) and spacer 32 (high strength brass, 0.060 inches thick) will substantially equal that of the rear housing 14 (15-5 steel, 0.220 inches thick) near the weld 70. Accordingly, the pressure transducer 10 is designed to anticipate and compensate for thermal expansions of materials during its assembly.

Another advantage of the present invention is that, by simply employing a different screen layout for the electrode substrate of the insulating substrate 30, pressure transducers 10 may be fabricated for optimally measuring pressures in different ranges of pressure. With reference to FIG. 4, the dimensions of the reference capacitor electrode 40 and the variable capacitor electrode 42 are designated by radii R1, R2, R3. By way of example and not of limitation, an ultra-high pressure transducer 10 for measuring pressures of 1,000–40,000 psi may be fabricated by selecting R1, R2, R3 to equal 0.095, 0.114, 0.149 inches, respectively. A capacitive transducer 10 for measuring pressures of 200–1,000 psi may be fabricated by selecting R1, R2, R3 to equal 0.130, 0.158, 0.205 inches, respectively. The variable capacitor electrode 42, as well as the flexible diaphragm 24, are preferably substantially circular in shape. The scope of the present invention contemplates electrodes 40, 42 varying in both size and shape.

Yet another advantage of the present invention is that the capacitive pressure transducer 10 provides superior performance characteristics over varying pressures and temperatures. The following table summarizes data taken from the testing of such a transducer when exposed to five different pressures at three different temperatures. The observed performance characteristics show a maximum linearity error of 0.257% from the ideal voltage output.

| INPUT VOLTAGE IS 5.000 + 0.001 VDC | | | | | |
| --- | --- | --- | --- | --- | --- |
| | PRESSURE | | | | |
| | PSIG | 0 | 5802 | 11603 | 17405 | 23206 |
| | BAR | 0 | 400 | 800 | 1200 | 1600 |
| SEQ. | VOLTAGE OUTPUT | 0.500 | 1.500 | 2.500 | 3.500 | 4.500 |
| 2 | −30° C. | 0.590 | 1.555 | 2.527 | 3.505 | 4.501 |
| 1 | RT(25° C.) | 0.499 | 1.481 | 2.474 | 3.475 | 4.488 |
| 3 | 100° C. | 0.549 | 1.555 | 2.564 | 3.579 | 4.564 |

Figure 7:
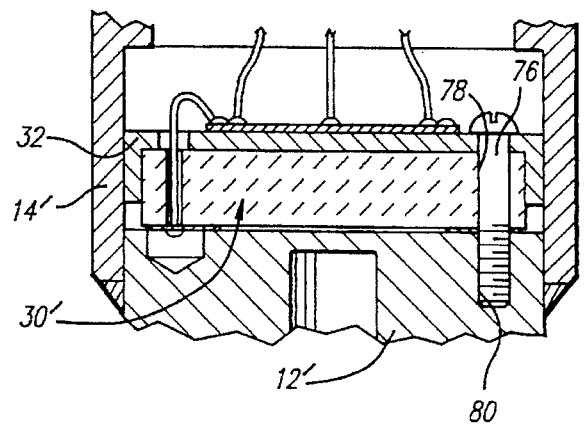
FIG. 7 is a cross-sectional side view of the capacitive pressure transducer including the alternative embodiment of the insulating substrate along the line 7—7 of FIG. 6.

FIG. 6 is a bottom view an alternative embodiment of the insulating substrate 30' which is secured to the front housing 12 with screws 76. FIG. 7 is a cross-sectional side view of the pressure transducer 10 including the alternative embodiment of the insulating substrate 30' along the line 7—7 of FIG. 6. The insulating substrate 30' includes a plurality of conduits 78 through which the screws 76 are passed. The front housing 12' includes a plurality of threaded chambers 80 for receiving the screws 76 for securing the insulating substrate 30' to the front housing 12'. An advantage of the alternative embodiment illustrated in FIG. 7 is that the rear housing 14' need not include an internal ridge surface 68 as shown in FIG. 1.

In conclusion, it is to be understood that the foregoing detailed description and the accompanying drawings illustrate the principles of the invention. However, various changes and modifications may be employed without departing from the spirit and scope of the invention. Other mechanical and electrical changes of a comparable nature could also be made. Accordingly, the present invention is not limited to the specific form shown in the drawings and described in detail hereinabove.

What is claimed is:

1. A simplified capacitive pressure transducer comprising:

a front housing including a conductive surface and a flexible diaphragm, a portion of the conductive surface comprising the flexible diaphragm;

a rear housing fitted to said front housing forming a transducer chamber;

a semiconductor circuit for providing an output signal variable in accordance with changes in input capacitance, said circuit being secured within said transducer chamber;

an insulating substrate including a reference capacitor electrode, a variable capacitor electrode and a plurality of vias, the insulating substrate being mechanically coupled to said front housing such that the conductive surface and the reference capacitor electrode form a reference capacitor and the conductive surface and the variable capacitor electrode form a variable capacitor, the reference capacitor electrode and the variable capacitor electrode being electrically connected to said semiconductor circuit through the vias; and said front housing being formed as a single homogenous high pressure metal fitting housing with a constant diameter bore extending through said front housing to form the flexible diaphragm, the bore having a diameter less than 0.25 inches;

said semiconductor circuit including signal processing circuitry and an isolating capacitor which electrically connects the conductive surface of the front housing to the signal processing circuitry.

2. The simplified capacitive pressure transducer of claim 1 wherein:

the variable capacitor electrode faces the portion of the conductive surface comprising the flexible diaphragm.

3. The simplified capacitive pressure transducer of claim 2 wherein:

the flexible diaphragm is substantially circular and has a diaphragm diameter; and the variable capacitor electrode is substantially circular and has a variable capacitor electrode diameter substantially equal to the diaphragm diameter.

4. The simplified capacitive pressure transducer of claim 1 wherein:

said rear housing includes an internal ridge surface; and said insulating substrate being mechanically coupled to the internal ridge securing said insulating substrate to said front housing.

5. The simplified capacitive pressure transducer of claim 1 further comprising:

a plurality of screws;

said insulating substrate further including a plurality of conduits through which said screws are passed; and said front housing further including a plurality of threaded chambers for receiving said screws for securing said insulating substrate to said front housing.

6. The simplified capacitive pressure transducer of claim 1 further comprising:

a spacer between said insulating substrate and said semiconductor circuit, said semiconductor circuit being mounted to said spacer.

7. The simplified capacitive pressure transducer of claim 6 wherein:

said spacer is sized to be fitted over said insulating substrate.

8. The simplified capacitive pressure transducer of claim 6 wherein:

said spacer and said insulating substrate are secured together as a modular assembly sized to fit within the transducer chamber.

9. The simplified capacitive pressure transducer of claim 1 further comprising:

a glass frit separating said front housing and said insulating substrate.

10. A simplified capacitive pressure transducer comprising:

a front housing including a conductive surface and a flexible diaphragm, a portion of the conductive surface comprising the flexible diaphragm; and an insulating substrate including a reference capacitor electrode and a variable capacitor electrode, the insulating substrate being mechanically coupled to said front housing such that the conductive surface and the reference capacitor electrode form a reference capacitor and the conductive surface and the variable capacitor electrode form a variable capacitor;

said front housing including the flexible diaphragm, said front housing being formed as a single homogenous high pressure metal fitting housing with a constant diameter bore extending through said front housing to form the flexible diaphragm.

11. The simplified capacitive high pressure transducer of claim 10 wherein:

the variable capacitor electrode faces the portion of the conductive surface comprising the flexible diaphragm.

12. The simplified capacitive pressure transducer of claim 11 wherein:

the flexible diaphragm is substantially circular and has a diaphragm diameter; and the variable capacitor electrode is substantially circular and has a variable capacitor electrode diameter substantially equal to the diaphragm diameter.

13. The simplified capacitive pressure transducer of claim 10 further comprising:

a hybrid circuit including signal processing circuitry and an isolating capacitor which electrically connects the conductive surface of the front housing to the signal processing circuitry.

14. The simplified capacitive pressure transducer of claim 10 further comprising:

a rear housing including an internal ridge surface, the rear housing being fitted to said front housing; and said insulating substrate being mechanically coupled to said internal ridge securing said insulating substrate to said front housing.

15. The simplified capacitive pressure transducer of claim 10 further including:

a plurality of screws;

said insulating substrate further including a plurality of conduits through which said screws are passed; and said front housing further including a plurality of threaded chambers for receiving said screws for securing said insulating substrate to said front housing.

16. The simplified capacitive variable transducer of claim 10 further including:

a hybrid circuit including signal processing circuitry; and a spacer between said insulating substrate and said hybrid circuit, said hybrid circuit being mounted to said spacer.

17. The simplified capacitive pressure transducer of claim 16 wherein:

said spacer is sized to be fitted over said insulating substrate.

18. The simplified capacitive pressure transducer of claim 16 further comprising:

a rear housing fitted to said front housing forming a transducer chamber;

said spacer and said insulating substrate being secured together as a modular assembly sized to fit within the transducer chamber.

19. The simplified capacitive pressure transducer of claim 10 further comprising:

a glass frit separating said front housing and said insulating substrate.

20. A simplified capacitive pressure transducer comprising:

a housing including a conductive surface and a flexible diaphragm, a portion of the conductive surface comprising the flexible diaphragm; and an insulating substrate including a plurality of capacitor electrodes, the plurality of capacitor electrodes and the conductive surface forming a plurality of capacitors;

said front housing being formed as a single homogenous high pressure metal fitting housing with a constant diameter bore extending through said front housing to form the flexible diaphragm, the bore having a diameter less than 0.25 inches.

* * * * *